Figure 1:
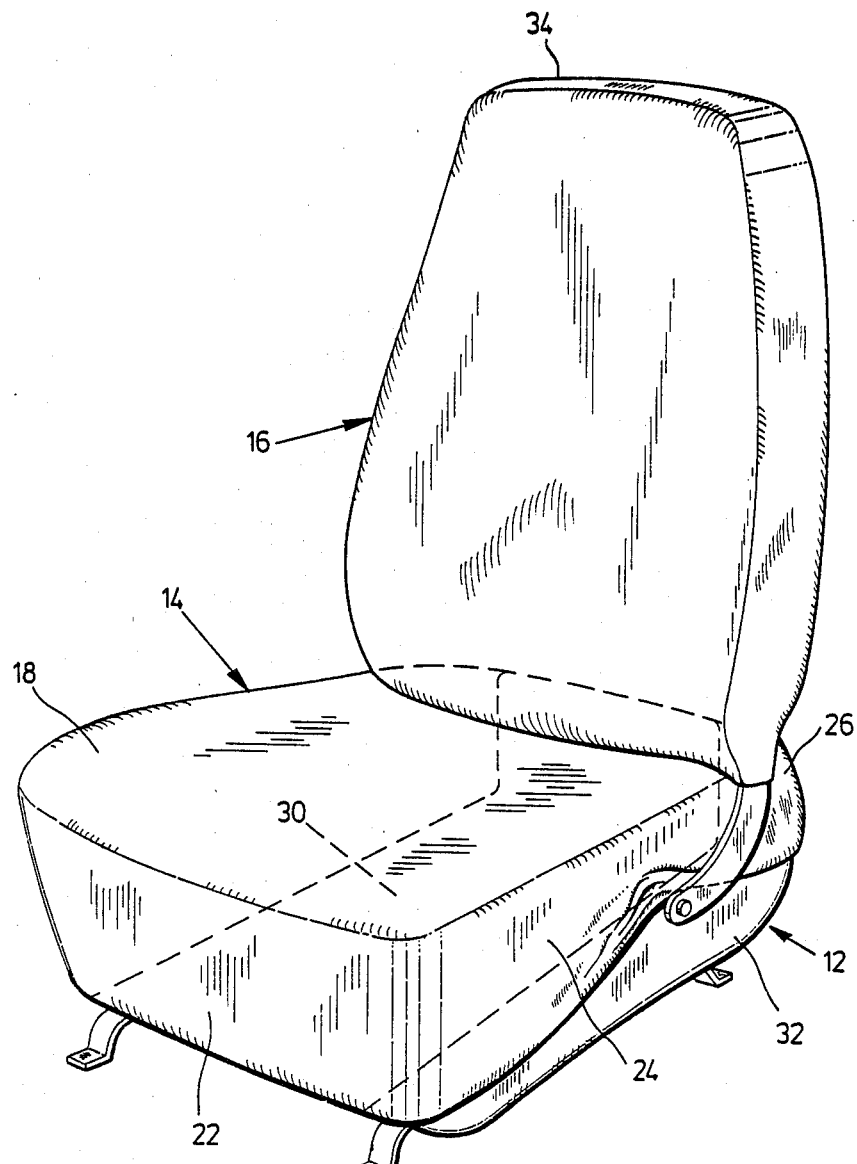

United States Patent [19]

Maruzzo et al.

[11] 4,400,030
[45] Aug. 23, 1983

[54] SEAT COVERS

[75] Inventors: Walter F. Maruzzo, Oakville; Herman DeBoersap, Burlington, both of Canada

[73] Assignee: Design Dynamics Limited, Ontario, Canada

[21] Appl. No.: 286,439

[22] Filed: Jul. 24, 1981

[51] Int. Cl.³ .............................................. A47C 31/10
[52] U.S. Cl. ................................... 297/219; 297/224
[58] Field of Search ............... 297/218, 219, 224, 229, 297/225

[56] References Cited

U.S. PATENT DOCUMENTS

| | | |
|---|---|---|
| 1,748,743 | 2/1930 | Wedler . |
| 1,817,404 | 8/1931 | Whaley .............................. 297/225 |
| 2,191,956 | 2/1940 | Coldren ............................. 297/224 |
| 2,229,160 | 1/1941 | Wittcoff .......................... 297/219 X |
| 2,567,579 | 9/1951 | Russell .............................. 297/218 |
| 2,587,128 | 2/1952 | Eull . |
| 2,729,278 | 1/1956 | Waranch ........................... 297/224 |
| 3,248,147 | 4/1966 | Testa ................................... 297/218 |
| 3,892,440 | 7/1975 | Dudley et al. . |
| 4,232,898 | 11/1980 | Bodrero ............................. 297/219 |

FOREIGN PATENT DOCUMENTS

| | | |
|---|---|---|
| 596730 | 4/1960 | Canada . |
| 901695 | 5/1972 | Canada . |
| 1031874 | 5/1978 | Canada . |
| 949825 | 2/1964 | United Kingdom . |
| 1143275 | 2/1969 | United Kingdom . |

*Primary Examiner*—Francis K. Zugel
*Attorney, Agent, or Firm*—Stevens, Davis, Miller & Mosher

[57] ABSTRACT

A seat part cover for a seat part of a seat has an upper portion to cover the top surface of the seat part, front and side portions extending downwardly from the upper portion to extend over the front and side surfaces of the seat part, and a band portion extending between the side portions for positioning around the rear surface of the seat part. The band portion is unattached to the upper portion to provide an opening between the band portion and the upper portion at the rear thereof. A flap portion extends from the front portion to extend beneath the seat part from the front to the rear, the flap portion being securable to the upper portion at the rear thereof.

8 Claims, 6 Drawing Figures

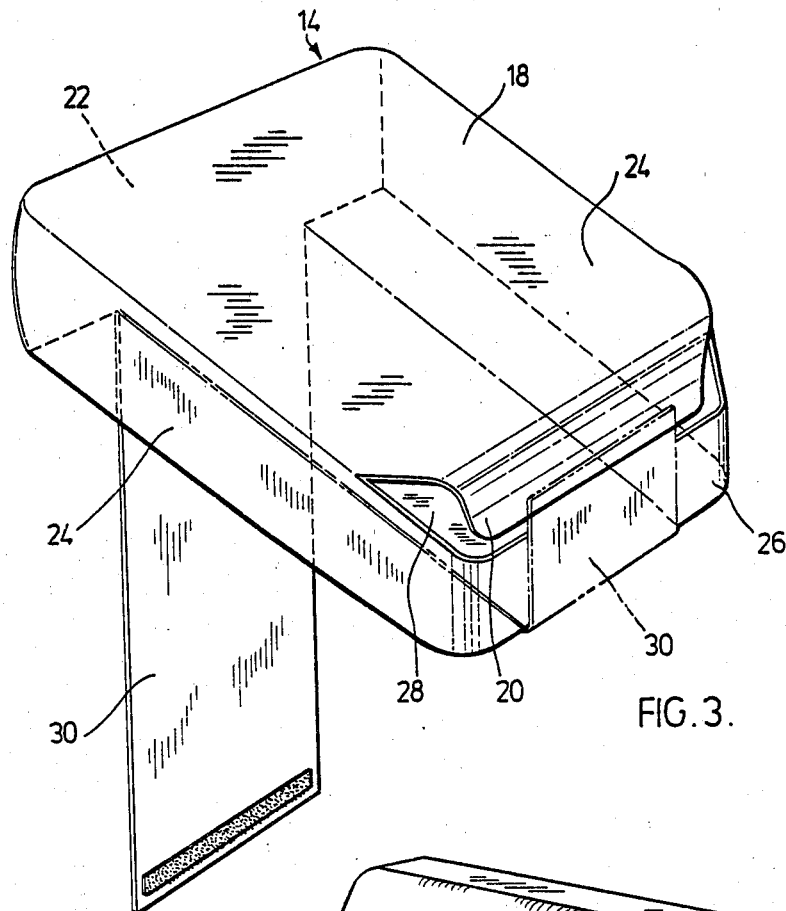
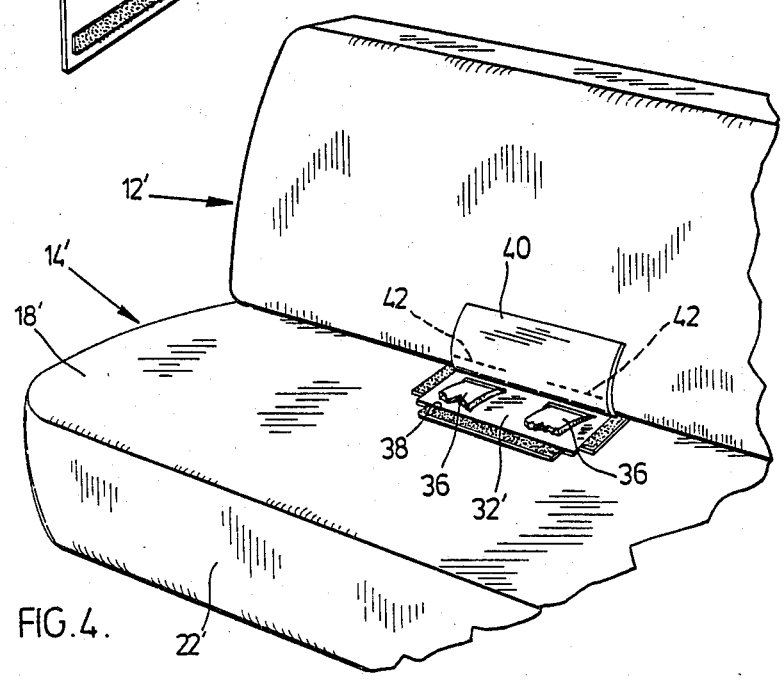

SEAT COVERS

This invention relates to seat covers, for example seat covers for automobile seats.

Automobile owners frequently fit covers over the seats of their vehicles to protect the seat from wear or to provide an improved appearance when the seat has become worn. It is well known that different makes and models of automobiles have seats of different shapes and sizes, thereby providing automobile seat cover manufacturers with the problem of providing seat covers in corresponding shapes and sizes. It is clearly advantageous if a single seat cover can adequately fit seats which differ somewhat in shape or size, so that the cover manufacturer need only provide a reduced number of different seat cover sizes.

It is therefore an object of this invention to provide a seat cover which would adequately fit seats of somewhat different size and/or shape.

According to the invention, a seat part cover comprises an upper portion to cover the top surface of the seat part, front and side portions extending downwardly from the upper portion to extend over the front and side surfaces of the seat part, a band portion extending between the side portions for positioning around the rear surface of the seat part, the band portion being unattached to the upper portion to provide an opening between the band portion and the upper portion at the rear thereof, and a flap portion extending from the front portion to extend beneath the seat part from the front to the rear, and means for securing the flap portion to the upper portion at the rear thereof.

The flap portion may be of elastic material, and the upper portion may be of relatively non-elastic seat material, with the front, side and band portions also being of elastic material.

The upper portion may have a rear extension which extends downwardly at least partly over the rear surface of the seat part, with the securing means securing the flap portion to the rear extension. The flap portion may be of a length to extend over at least a portion of the rear surface of the seat part.

The present invention also provides a seat cover combination including a seat part cover as previously described, and a back part cover having front and rear portions, side portions and a top portion connected between the front and rear portions, the front, rear, and side portions having lower ends providing an opening to enable the back part cover to be fitted on the back part of the seat by pulling downwardly over the back part from the top thereof.

The front portion of the back part cover may be of relatively non-elastic material with the rear portion being of elastic material. The side portions of the back part cover may also be of elastic material.

The back part cover may include means for securing the lower ends of the front and rear portions together.

The top portion of the back part cover may be of elastic material.

The elastic top portion of the back part cover may have a slit to enable the back part cover to be fitted to a back part with a head rest, the slit being positioned to permit the headrest to pass therethrough during installation.

Figure 2:
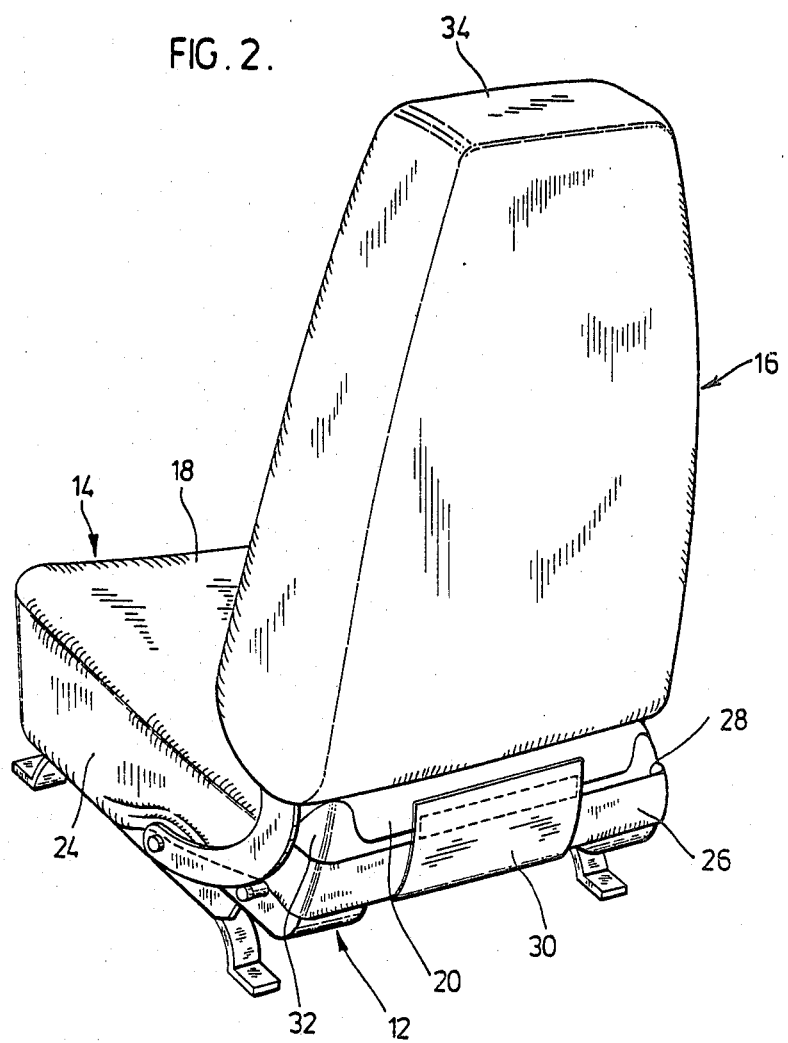
Figure 5:
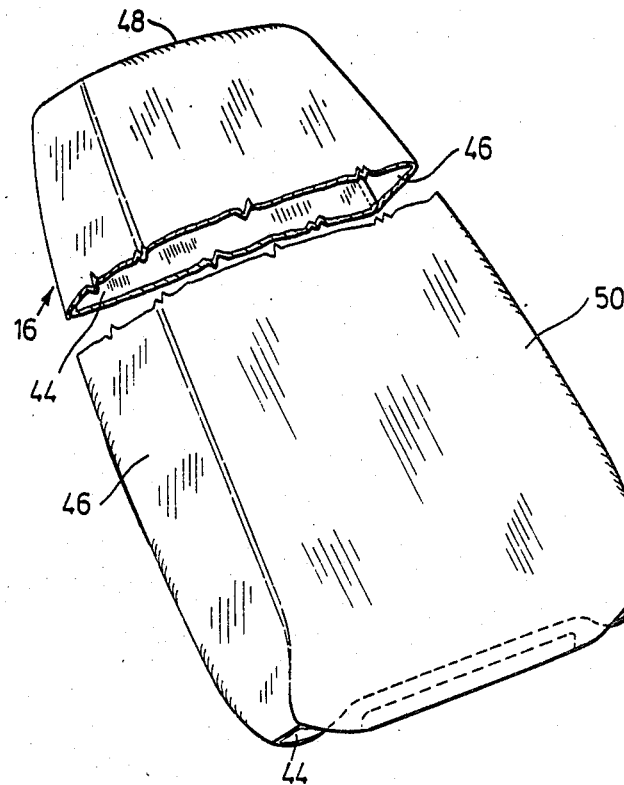
Figure 6:
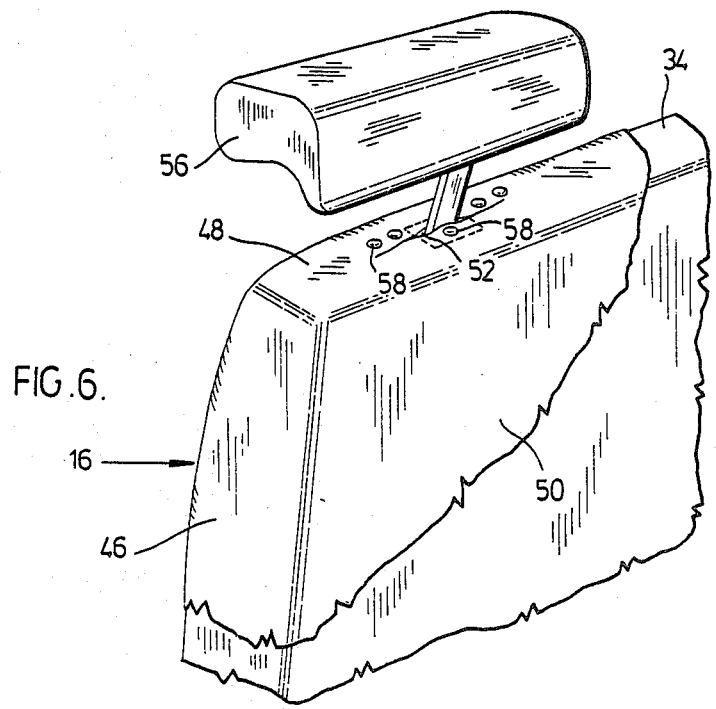

Embodiments of the invention will now be described by way of example, with reference to the accompanying drawings of which:

FIG. 1 is a front perspective view of an automobile seat with a seat part cover in accordance with one embodiment fitted thereto, FIG. 2 is a rear perspective view thereof, FIG. 3 is a somewhat diagrammatic view of the seat part cover, FIG. 4 is a somewhat diagrammatic view showing a seat part cover fitted on a seat part with seat belts, FIG. 5 is a front perspective view of a back part cover, and FIG. 6 is a rear perspective view, partly broken away, showing a back part of an automobile seat with the back part cover fitted thereto.

Referring first to FIGS. 1 to 3 of the drawings, the seat cover combination for an automobile seat 12 intended for one person comprises a seat part cover 14 and a back part cover 16. The seat part cover 14 has an upper portion 18 of relatively non-elastic seat material, with an extension 20 projecting from its rear edge. Front and side portions 22, 24 of elastic material extend downwardly from the upper portion 18, and a band portion 26 of elastic material extends from one side portion 24 to the other at the rear thereof, the band portion 26 being unattached to the upper portion 18 so as to leave an opening 28 therebetween. A flap portion 30 of elastic material extends from the bottom of the front portion 22 and has an unstretched length of about half the distance between the front and rear of the upper portion 18.

The seat part cover 14 is fitted to the seat part 32 of the automobile seat 12 by pulling the elastic front and side portions 22, 24 downwardly over the front and sides of the seat part 32 so that the upper portion 18 of non-elastic seat material engages the upper surface of the seat part 32. The elastic band portion 26 is pushed between the seat part 32 and back part 34 and positioned to extend around the rear of the seat part 32 as shown in FIG. 2. The elastic flap portion 30 is then passed along the underneath of the seat part 32 and stretched until it projects beyond the rear of the seat 32 and extends upwardly over the rear thereof, passing over the band portion 26, to overlap the rear extension 20.

The elastic flap 30 is then secured to the rear extension 20 in any suitable manner, and for this purpose these two portions may be provided with strips of material available under the trade mark VELCRO which readily adhere to one another. Other suitable securing arrangements may of course be used if desired.

The elastic front and side portions 22, 24, the elastic band portion 26 and the elastic flap portion 30 not only cause the seat part cover 14 to neatly and securely fit the seat part 32, but also enable the seat part cover 14 to neatly and securely fit seat parts of somewhat different size and shape. The upper portion 18 can be of any suitable seat material of attractive appearance and good durability. The seat part cover 14 can also clearly be easily fitted and removed. A further advantage is that no additional fasteners are required.

FIG. 4 shows a seat part cover 14' for a bench type automobile seat 12'. The construction of the seat part cover 14' is generally similar to that of the seat part cover 14 described with reference to FIGS. 1 to 3. However, to enable seat belts 36 to be readily accessible, the upper portion 18' of the seat part cover 14 is provided with an opening 38 with a flap 40 at the approximate position of the seat belts 36.

When installing the seat part cover 14', two slots 42 are cut through the flap 40, and the seat belts 36 are passed therethrough so as to lie on the top of the upper portion 18'. The edges of the flap 40 and adjacent edges of the upper portion 18' surrounding the opening 38 are provided with appropriate securing means, such as VELCRO strips of the kind previously mentioned, so that the opening 38 can then be closed by securing the flap 40 to the adjacent parts of the upper portion 18'.

Referring now to FIGS. 5 and 6, the back part cover 16 has a front portion 44 of relatively non-elastic material of the kind used for the upper portion 18 of the seat part cover 14, and side, top and rear portions 46, 48, 50 respectively of elastic material secured to the front portion 44. The lower end of the back part cover 16 is open so that it can be pulled down over the back seat part 34. The elastic top portion 48 has a relatively small slit 52 through which the headrest 54 passes, with the elastic nature of the top portion 48 enabling the slit 52 to appropriately enlarge and then contract to its normal size after the headrest has passed therethrough. The opposite sides of the slit 52 may be provided with snap fasteners 56 to enable most of the slit 52 to be closed up after installation of the back part cover 16. The lower edges of the front and rear portions 44, 50 can be secured together under the bottom of the back seat part 32 by appropriate securing means, such as VELCRO strips. Thus, it is not necessary to remove the headrest 54 when installing the back part cover 16.

The elastic top, side and rear portions 48, 46, 50 not only enable the back part cover 16 to neatly and securely fit the back seat part 34, but also enable the back part cover 16 to neatly and securely fit back parts of somewhat different size and shape. Also, the back part cover 16 can be easily fitted and removed.

The advantages of the described embodiments are therefore clearly evident. Other embodiments will be readily apparent to a person skilled in the art, the scope of the invention being defined in the appended claims.

What we claim is:

1. A seat cover for a seat part of an automobile seat having an upstanding backrest part, said seat part having top, bottom, side, front and rear surfaces, said seat cover comprising an upper portion of relatively non-elastic seat material to cover the top surface of the seat part and terminating in a defined edge on a rear extension thereof, front and side portions of elastic material extending downwardly from the upper portion of relatively non-elastic seat material to extend over the front and side surfaces of the seat part, a band portion of elastic material extending between the side portions of elastic material for positioning around the rear surface of the seat part, the band portion of elastic material being unattached to the upper portion to provide an opening between the band portion and said defined edge, said seat cover being installable without opening said band or removing said backrest by said band being stretchable so that the seat cover can be installed on the seat part by sliding said backrest through said opening so that when in place on the seat part the band is then stretched across the rear surface of the seat part, and a flap portion of elastic material extending beneath the seat part between the front and the rear, and means for securing the flap portion so as to be stretched between the front portion and the defined edge.

2. A seat cover according to claim 1 wherein the flap portion is of a length to extend over at least a portion of the rear surface of the seat part.

3. A seat cover combination for a seat part and a back part of a seat, said seat part having top, bottom, side, front and rear surfaces and said back part having front, rear, side, top and bottom surfaces, said seat cover combination comprising a seat cover according to claim 1 and a back part cover having front and rear portions, side portions and a top portion connected between the front and rear portions, said front, rear, top and side portions corresponding in size to the front, rear, top and side surfaces of the back part, the front, rear and side portions having lower ends providing an opening to enable the back part cover to be fitted on the back part of the seat by pulling downwardly over the back part from the top thereof.

4. A seat cover combination according to claim 3 wherein the front portion of the back part cover is of relatively non-elastic material and the rear portion is of elastic material.

5. A seat cover combination according to claim 4 wherein the side portions of the back part cover are also of elastic material.

6. A seat cover combination according to claim 3 wherein the back part cover includes means for securing the lower ends of the front and rear portions together.

7. A seat cover combination according to claim 3 wherein the top portion of the back part cover is of elastic material.

8. A seat cover combination according to claim 7 wherein the elastic top portion of the back part cover has a slit to enable the back part cover to be fitted to a back part with a headrest, the slit being positioned to permit the headrest to pass therethrough during installation.

* * * * *